United States Patent
Morin et al.

(10) Patent No.: US 10,495,944 B2
(45) Date of Patent: Dec. 3, 2019

(54) NONLINEAR OPTICAL SYSTEM FOR GENERATING OR AMPLIFYING LIGHT PULSES BY N-WAVE MIXING, INCLUDING A FAST MODULATING DEVICE

(71) Applicant: AMPLITUDE SYSTEMES, Pessac (FR)

(72) Inventors: Franck Morin, Canéjan (FR); Clemens Honninger, Cestas (FR); Martin Delaigue, Bordeaux (FR)

(73) Assignee: AMPLITUDE SYSTEMES, Pessac (FR)

( * ) Notice: Subject to any disclaimer, the term of this patent is extended or adjusted under 35 U.S.C. 154(b) by 0 days.

(21) Appl. No.: 15/767,769

(22) PCT Filed: Oct. 19, 2016

(86) PCT No.: PCT/FR2016/052698
§ 371 (c)(1),
(2) Date: Apr. 12, 2018

(87) PCT Pub. No.: WO2017/068281
PCT Pub. Date: Apr. 27, 2017

(65) Prior Publication Data
US 2018/0299746 A1    Oct. 18, 2018

(30) Foreign Application Priority Data

Oct. 19, 2015  (FR) ...................................... 15 59950

(51) Int. Cl.
*G02F 1/35* (2006.01)
*H01S 3/13* (2006.01)
(Continued)

(52) U.S. Cl.
CPC .............. *G02F 1/353* (2013.01); *G02F 1/365* (2013.01); *H01S 3/10046* (2013.01); *H01S 3/1302* (2013.01); *G02F 2201/20* (2013.01)

(58) Field of Classification Search
None
See application file for complete search history.

(56) References Cited

U.S. PATENT DOCUMENTS 6,498,801 B1   12/2002  Dudelzak et al.
2,781,271 A1   7/2014   Karras
(Continued)

FOREIGN PATENT DOCUMENTS

WO   2009/079759 A1   7/2009
WO   2013/029154 A1   3/2013

OTHER PUBLICATIONS

Huan Zhao et al.: "Sum-frequency generation between an actively synchronized ultrashort Ti:sapphire laser and a Nd:YVO4 laser", Journal of the Optical Society of America—B, Optical Society of America, Washington, US, vol. 25, No. 7, Apr. 24, 2008 (Apr. 24, 2008), pp. B39-B43, XP007907952, ISSN: 0740-3224, [retrieved on Apr. 24, 2008], DOI: 10.1364/JOSAB.25.000B39.
(Continued)

*Primary Examiner* — Rhonda S Peace
(74) *Attorney, Agent, or Firm* — Young & Thompson

(57) ABSTRACT

Disclosed is a nonlinear optical system for generating or amplifying light pulses by N-wave mixing, including a nonlinear optical medium suitable for receiving at least one first light pulse and one second light pulse. The system includes a fast modulation device for modulating a time delay between the second light pulse and the first pulse light in the nonlinear optical medium, the time delay modulation device being placed upstream of the nonlinear optical medium, and the time delay modulation device being modulated at least between a first delay value and a second delay (Continued)

value, so as to modulate the generation or amplification of a light pulse by N-wave mixing of the at least one first light pulse et one second light pulse in the nonlinear optical medium.

20 Claims, 2 Drawing Sheets

(51) Int. Cl.
*H01S 3/10* (2006.01)
*G02F 1/365* (2006.01)

(56) References Cited

U.S. PATENT DOCUMENTS

| | | | | |
|---|---|---|---|---|
| 8,781,271 | B1* | 7/2014 | Karras | G02B 6/2861 |
| | | | | 257/E31.095 |
| 9,525,264 | B2* | 12/2016 | Courjaud | H01S 3/2325 |
| 9,570,882 | B2* | 2/2017 | Spiekermann | H01S 3/09415 |
| 10,020,632 | B2* | 7/2018 | Courjaud | B23K 26/0608 |
| 2013/0163071 | A1 | 6/2013 | Solli et al. | |
| 2018/0299746 | A1* | 10/2018 | Morin | G02F 1/353 |

OTHER PUBLICATIONS

S. A. Crooker et al.: "Femtosecond synchronization of two passively mode-locked Ti:sapphire lasers", Review of Scientific Instruments., vol. 67, No. 6, Mar. 11, 1996 (Mar. 11, 1996), US, pp. 2068-2071, XP055268635, ISSN: 0034-6748, DOI: 10.1063/1.1147016.
International Search Report, dated Feb. 20, 2017, from corresponding PCT/FR2016/052698 application.

* cited by examiner

NONLINEAR OPTICAL SYSTEM FOR GENERATING OR AMPLIFYING LIGHT PULSES BY N-WAVE MIXING, INCLUDING A FAST MODULATING DEVICE

TECHNICAL FIELD TO WHICH THE INVENTION RELATES

The present invention relates to a non-linear optical system for generating or amplifying high-power and/or high-energy light pulses in the ultraviolet, visible or infrared (UV, visible, IR) spectral domain.

More precisely, the invention relates to a device for the controlled and fast modulation of a pulse train from a non-linear optical system operating by mixing of at least three waves.

A non-linear optical system for generating or amplifying ultra-short pulses generally emits at a high repetition rate, in general comprised between 50 kHz and 100 MHz.

In the present document, it is meant by "light pulses", short pulses of duration lower than the millisecond or ultra-short pulses of picosecond, sub-picosecond or femtosecond duration. It is meant by "high-power pulses", a light pulse having a peak power comprised between 1 kW and 1 GW and, preferably, higher than or equal to 1 MW, and by "high-energy pulse", a light pulse having an energy comprised between 100 microjoules and 1 kilojoule and, preferably, higher than or equal to 1 millijoule.

TECHNOLOGICAL BACKGROUND

There exist different non-linear N-wave mixing optical systems, where N is a natural integer higher than or equal to three. In non-linear optics, the N-wave mixing covers in particular the three-wave mixing, where a transfer of energy occurs between three electromagnetic waves interacting in a non-linear medium, and the four-wave mixing, where a transfer of energy occurs between four electromagnetic waves interacting in a non-linear medium. The three-wave mixing finds, among other things, applications in the sum frequency, in particular the frequency doubling, the frequency differencing and the optical parametric amplification.

FIG. 1 schematically illustrates a conventional non-linear optical system configured for the optical frequency doubling, also called the second-harmonic generation. A first laser source 11 generates a first source signal 51 formed of light pulses at a given repetition frequency. A second laser source 12 generates a second source signal 52 formed of light pulses synchronized on the light pulses of the first source signal 51. The two laser sources 11, 12 have herein the same wavelength. The two light pulse signals 51, 52 are directed towards a non-linear optical medium 20. The non-linear optical medium may be a solid medium, for example an LBO, BBO, KDP crystal, or an optical fibre, or also a gaseous medium. The spatial and temporal superposition of the two source signals 51, 52 in the non-linear optical medium 20 makes is possible to generate an output signal 60 composed of light pulses at an optical frequency equal to the double of the optical frequency of the two laser sources 11, 12 and at the same repetition frequency as the two sources 11, 12.

FIG. 2 schematically illustrates another example of a non-linear optical system configured for the optical parametric amplification of light pulses. The same signs of reference represent components similar to those of FIG. 1. The two laser sources 11, 12 have generally the same repetition frequency, however the respective duration of the pulses is not necessary the same. Unlike FIG. 1, in FIG. 2, the two laser sources 11, 12 have generally not the same wavelength. A pump beam 52 composed of high-energy pulses is sent into a non-linear optical medium 20 to be combined with a signal beam 51 of lower energy. Under certain conditions, and in particular of spatial and temporal superposition of the pulses of the pump beam 12 and of the signal beam 11 in the non-linear optical medium 20, a transfer of energy may occur from the pump beam 12 towards the signal beam 11, hence generating an amplified beam 61 accompanied with the emission of a low-energy residual beam 62. This technique of optical parametric amplification hence makes it possible to amplify the signal 51 to form said amplified signal 61.

The different physical processes of N-wave mixing are instantaneous phenomena of non-linear optics that require the spatial and temporal superposition of all the pulses involved.

The shooting rate of the output pulse is often fixed as a function of the architecture used and of the features desired for the light pulse beam. The "Master Oscillator, Power Amplifier" (MOPA) architecture is commonly used to make high-power light pulse laser sources. In this case, the master oscillator of the laser source generates source pulses at a given rate, then these source pulses are amplified in one or more amplification stages.

Now, for certain applications, the user may need varying the pulse rate of the signal resulting from the non-linear optical conversion or even fully interrupting then resuming the shots.

The command or control of pulse train generated or amplified in a non-linear optical system may have different purposes. In some cases, it is desired to have a fast shutter, to switch-off or switch-on the beam from one pulse to the following one, at the output of the N-wave mixing system. In other cases, it is desired to have a frequency reducer, to generate an output signal at a repetition frequency lower than that of the oscillator of the laser source, for example by selecting one pulse out of 2, out of 3 or out of N. Moreover, it is desired to have a control system making it possible to generate a pulse on demand, the emission of a pulse being triggered on demand of the user via an electronic control signal.

A known technique consists in modifying the shooting frequency upstream from the non-linear optical conversion system. However, this frequency modification generally causes modifications of the features of the output beam (pulse energy and duration, shape and quality). In certain architectures, the modification of the shooting frequency before the non-linear optical (NLO) medium may produce super-power pulses and cause the degradation or even the destruction of the non-linear optical medium.

Another technique conventionally used to control the pulse train consists in placing an optical modulator, of the acousto-optic or electro-optic type, at the output of the non-linear optical conversion system. Such an optical modulator makes it possible, when activated, to modify the properties of the pulses that pass through it, so as to be able afterwards to spatially separate them from the other pulses. However, the speed of an electro-optic or acousto-optic modulator is currently limited to a rate of the order of 10 MHz. On the other hand, an optical modulator placed at the output of a non-linear optical conversion system induced power losses. These losses are of the order of 10 to 20% for an acousto-optic modulator and, respectively, of the order of 5% for an electro-optic modulator.

Finally, in the case of high-power lasers, the laser beam may damage the optical modulator if placed at the end of the amplification chain. Arranging an optical modulator at the output of a non-linear optical converter system hence suffers from significant limitations.

OBJECT OF THE INVENTION

In order to remedy the above-mentioned drawback of the state of the art, the present invention proposes a non-linear optical system for generating or amplifying light pulses by N-wave mixing, where N is a natural integer higher than or equal to three, including a non-linear optical medium adapted to receive at least one first light pulse and one second light pulse having respective durations of the same order of magnitude.

More particularly, it is proposed according to the invention a non-linear optical system for generating or amplifying light pulses including a device for modulating a time delay between the second light pulse and the first light pulse in the non-linear optical medium, the time delay modulation device being arranged upstream from the non-linear optical medium, and the modulation device being adapted to receive the first light pulse and the second light pulse, synchronized with each other, and to switch the time delay between at least one first delay value and, respectively, one second delay value, so as to modulate the generation or the amplification of a light pulse by N-wave mixing of said at least one first light pulse and one second light pulse in the non-linear optical medium.

This time delay modulation device advantageously makes it possible to control the rate of the output pulse train, generated by N-wave mixing. This system is only limited by the switching speed of the time delay modulation device used. This non-linearly converted pulse system with time delay modulation makes it possible to generate a pulse on demand by N-wave mixing, from the maximum rate of the source to a single pulse and the complete extinction of the signal generated by N-wave mixing.

Preferentially, the time delay modulation device is switchable between the first delay value and the second delay value, the first delay value being configured so that said at least one first light pulse and one second light pulse are spatially and temporally superimposed to each other in the non-linear optical medium, and the non-linear optical medium being configured to generate or amplify a light pulse by N-wave mixing of said at least one first light pulse and one second light pulse, where N is a integer higher than or equal to three, and the second delay value being configured so that said second light pulse has a time delay with respect to said first light pulse in the non-linear optical medium, the second delay value being adapted to limit the generation or the amplification by N-wave mixing of said at least one light pulse and one second light pulse in the non-linear optical medium.

In the present document, limiting the generation or amplification by N-wave mixing means limiting a pulse generated by N-wave mixing to a predetermined amplitude or intensity, for example 50% of the pulse generated by N-wave mixing for the first delay value, or less than 10%, and preferably less than 1% or 1 per thousand.

This time delay modulation device advantageously makes it possible to control the rate of the output pulse train. It is only limited by the switching speed of the time delay modulation device used. This non-linearly converted pulse laser with time delay modulation makes it possible to generate a pulse on demand by N-wave mixing, from the maximum rate of the source to a single pulse and the complete extinction of the signal generated by N-wave mixing.

The time delay modulation device generates no power loss at the output of the non-linear optical medium, because the time delay is adjusted upstream from the non-linear optical medium. This modulation device is not limited in pulse power or energy. This modulation device is independent of the type of non-linear conversion made in the non-linear optical medium, and of the duration of the generated or amplified pulses.

Moreover, the modulation device is independent of the wavelength generated by the non-linear process, which may be very advantageous in the case of a frequency-tunable system.

Other non-limitative and advantageous features of the system comprising a time delay modulation device according to the invention, taken individually or according to all the technically possible combinations, are the following:
- the system comprises an optical filtering device arranged at the output of the non-linear optical medium, the optical filtering device being configured to spatially separate, to one output, the light pulse generated or amplified by N-wave mixing and, to the other output, the first light pulse and/or the second light pulse;
- the non-linear optical medium is configured to generate another light pulse by sum frequency, the optical frequency of the light pulse generated by sum frequency being equal to the sum of the optical frequencies of said at least one first light pulse and one second light pulse, and the optical filtering device includes a spectral filter adapted to separate the sum optical frequency from the respective optical frequencies of said at least one first light pulse and one second light pulse;
- the system comprises a first optical amplifier arranged to receive a first source signal and form the first light pulse and a second optical amplifier arranged to receive a second source signal and form the second light pulse;
- the system includes a first source adapted to generate the first source signal and a second source adapted to generate the second source signal, and a device for synchronizing the first source signal with respect to the second source signal;
- the modulation device is integrated in the second source;
- the system includes a source adapted to generate a source pulse light signal and a beam splitter configured to separate the source pulse light signal and form the first source signal and the second source signal;
- the system further includes a rate reducer arranged between the source and the beam splitter;
- the time delay modulation device includes a first pulse selector arranged in an optical path of the first source signal and a second pulse selector arranged in the optical path of the second source signal;
- the time delay modulation device includes a variable optical delay line arranged in the optical path of the second source signal;
- the variable optical delay line comprises an acousto-optic or electro-optic modulator configured to switch the second source signal either towards a first optical path, having a first optical delay value associated with the first time delay value, or towards a second optical path, having a second optical delay value associated with the second time delay value.

DETAILED DESCRIPTION OF AN EXEMPLARY EMBODIMENT

The following description with respect to the appended drawings, given by way of non-limitative examples, will allow to well understand in what consists the invention and how it can be implemented.

Figure 1:
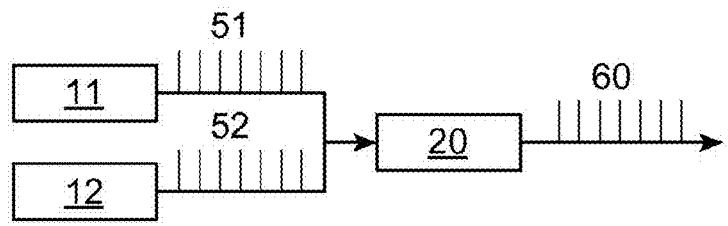
FIG. 1 shows a non-linear optical conversion system configured for the frequency doubling, according to the prior art.
Figure 2:
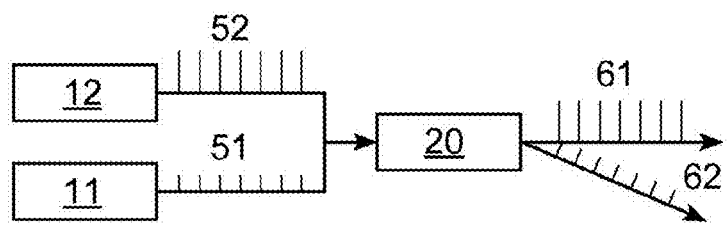
FIG. 2 shows a non-linear optical system configured for the optical parametric amplification, according to the prior art.
Figure 3:
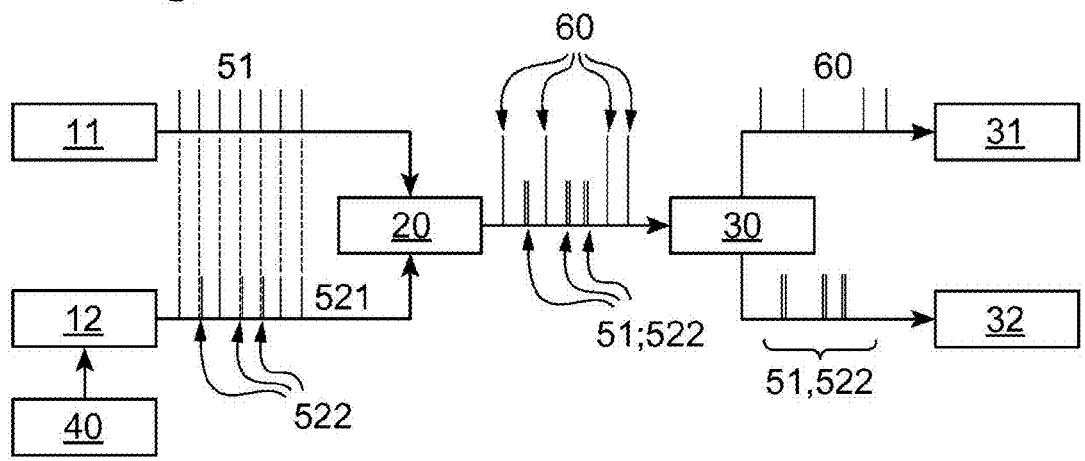
Figure 4:
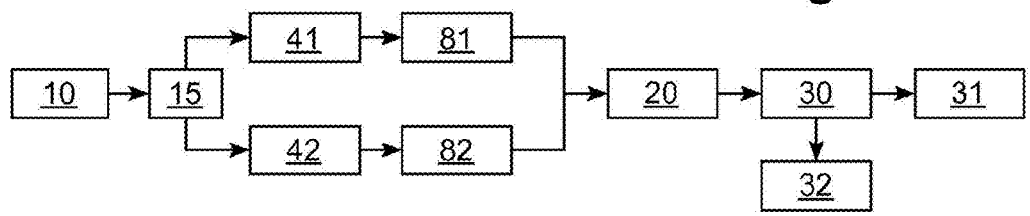
Figure 5:
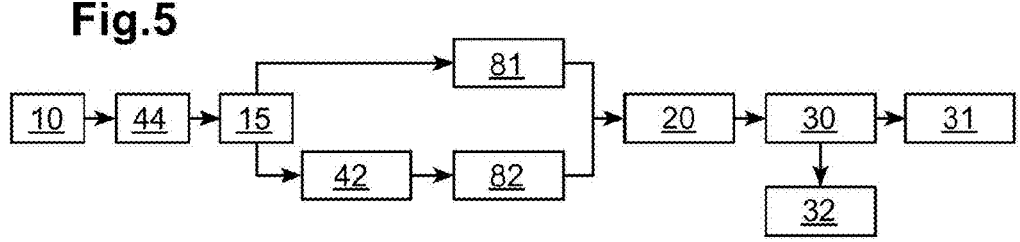
Figure 6:
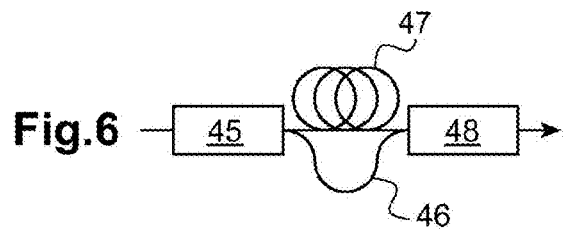
Figure 7:
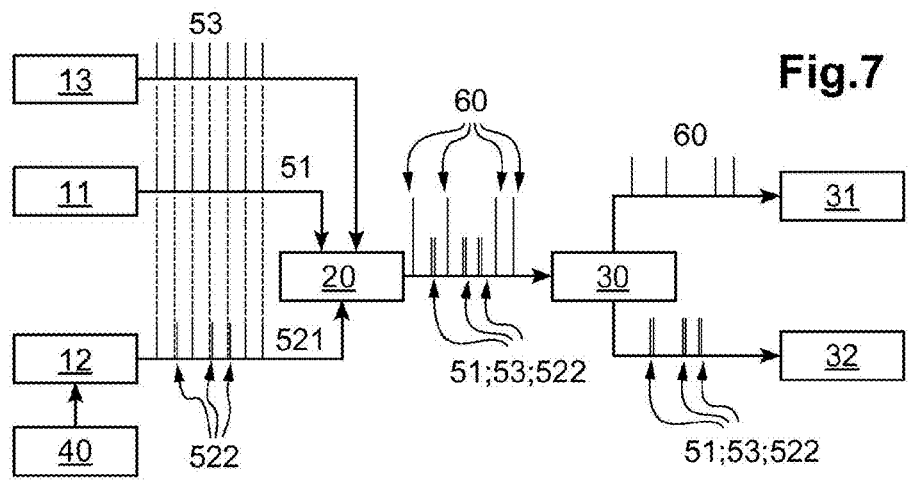

FIG. 3 schematically shows a non-linear optical N-wave mixing system integrating an output pulse rate fast modulation device according to a first embodiment of the invention;

FIG. 4 schematically shows another non-linear optical N-wave mixing system integrating another output pulse rate fast modulation device according to a second embodiment of the invention;

FIG. 5 schematically shows a non-linear optical N-wave mixing system integrating another output pulse rate fast modulation device according to a variant of the second embodiment of the invention;

FIG. 6 illustrates an example of a switchable optical delay line according to an embodiment of the invention;

FIG. 7 schematically shows a non-linear optical four-wave mixing system integrating an output pulse rate fast modulation device according to another embodiment of the invention.

DEVICE

In FIG. 3 is shown a non-linear optical N-wave mixing system, comprising a first laser source 11, a second laser source 12, a non-linear optical medium 20 and an optical filter 30.

The first laser source 11 emits a first source pulse signal 51, and the second laser source 12 emits a second source pulse signal 52. The second laser source 12 is synchronized with the first laser source 11. The pulses of the source pulse signals 51, respectively 52, have a duration D that is generally of the same order of magnitude, but not necessary the same duration. Advantageously, the source pulse signals 51, 52 have an identical repetition rate. As an alternative, the repetition rate of a laser source 11 is an integer multiple of the repetition rate of the other laser source 12. It is herein supposed that the optical path from the first laser source 11 to the non-linear optical medium 20 has the same length as the optical path from the second laser source 12 to the non-linear optical medium 20.

In the present document, it is meant by "synchronized pulses", pulses that have a residual synchronization defect (or "jitter") remaining lower in absolute value than 10%, and preferably than 5%, or even better lower than 1%, or even 0.5% of the duration D of the pulses on a time interval from a few minutes to a few hours. For example, pulses having a duration of 300 fs are synchronized so as to have a residual synchronization defect lower than 30 fs over a period of use of the laser from a few minutes to a few hours. Ideally, the pulse residual synchronization defect is null.

The system of FIG. 3 further includes a time delay control and command device 40, of the electronic or electro-optic type, integrated to the second laser source 12. The time delay control and command device 40 makes it possible to control the time delay of one pulse of the second signal 52 with respect to one pulse of the first signal 51 at the non-linear optical medium. More precisely, the time delay control and command device 40 makes it possible to apply either a first time delay value or a second time delay value. The first delay value, denoted R1, corresponds to a delay that is lower, in absolute value, than the duration D of the source pulses and preferably null (or equal to a multiple of the repetition period of the source signals 51, 51), or in other words: $|R1|<D$ (modulo T). The second delay value, denoted R2, corresponds to a non-null delay, that is higher, in absolute value, than the duration D of the source pulses and lower than the repetition period T of the source signals 51, 52 reduced by the duration D of a light pulse (modulo the pulse repetition period T), or in other words: $D<|R2|$ (modulo T).

Hence, when the time delay is equal to the first value, R1, a pulse of the first source signal 51 and another pulse of the second source signal 52 are temporally and spatially superimposed to each other in the non-linear optical medium 20, so as to generate a pulse 60 by wave mixing (for example by frequency conversion).

On the other hand, when the time delay is equal to the second value, R2, a pulse of the first source signal 51 and a delayed pulse 522 of the second source signal have no temporal overlap in the non-linear optical medium 20, so that no wave mixing can occur.

Hence, by fast switching the time delay from a second value (for example, a non-null delay R2) to a first value (for example, a null delay R1), the emission of a pulse 60 by wave mixing in the non-linear optical medium 20 is triggered on demand. Conversely, by fast switching the time delay from a first value (null delay R1) to a second value (non-null delay R2, for example equal to 2.D), the wave mixing in the non-linear optical medium 20 is instantaneously stopped. The time delay modulation is faster than the pulse repetition frequency.

The time delay modulation device of the second source 12 makes it possible to change the repetition frequency of the pulses non-linearly converted at the output of the non-linear optical medium 20.

When two pulses 51 and 52 generated by the first laser source 11 and, respectively, the second laser source 12 arrive simultaneously in the non-linear optical medium 20, there is a generation of a pulse 60 by wave mixing. In the case where the non-linear optical medium 20 is configured for a wave mixing by frequency conversion, for example for the generation of a sum frequency, the pulse 60 has an optical frequency equal to the sum of the respective optical frequencies of the source pulses 51 and 52.

On the contrary, when a delayed pulse 522 from the second laser source 12 has, in the non-linear optical medium 20, a time delay R2 with respect to a pulse 51 of the first laser source 11, this time delay is higher than or equal to the duration D of the source pulse 51 and/or 522, and lower than or equal to T-D, the light pulse 51 of the first source cannot interact with the delayed pulse 522 of the second source in the non-linear optical medium 20 and the pulses 51 and 522 are transmitted without generating a signal by wave mixing.

An optical filter 30 at the output of the non-linear optical medium 20 is adapted to spatially separate, to an output 31, the light pulse signal 60 generated by wave mixing and, respectively, to another output 32, the source signals 51, 522 that have not interacted by wave mixing in the non-linear optical medium 20.

The optical filter 30 is selected among a spectral and/or polarizing filter as a function of the properties of the source signals 51, 52 and of the signal(s) 60 generated or amplified by wave mixing.

As an alternative, in the case where the length of the optical path from the first laser source 11 to the non-linear optical medium 20 is different from the length of the optical path from the second laser source 12 to the non-linear optical medium 20, the delay applied to the second source is adapted to switch between a first value R1 and a second value R2. More precisely, the first value R1 is determined as a function of the optical path difference so that the source pulses 51, 521 are spatially and temporally superimposed to each other in the non-linear optical medium 20, with a relative time delay lower than the duration of one pulse. And, respectively, the second value R2 is determined as a function of the optical path difference so that the source pulses 51, 522 have, in the non-linear optical medium 20, a relative time delay higher than or equal to the duration of one pulse and lower than or equal to the repetition period T reduced by the duration of one pulse.

The time delay modulation of each pulse 52 emitted by the second source 12 makes it possible to control the pulse train from the non-linear conversion stage in a very fast manner, without affecting the properties of the pulses (duration, energy, spatial form . . . ) and with no power loss.

This delay modulation between the light pulses 51, 52 upstream from the non-linear optical medium 20 has many advantages:
- the speed of control on the output pulse train 60 is only limited by the switching speed of the delay line used;
- this modulation makes it possible to generate pulses by N-wave mixing on demand, from the maximum rate of the sources to a single pulse and up to the complete extinction of the pulses generated or amplified by N-wave mixing in the non-linear optical medium.

The delay modulation device may be made as a very compact and cheap variable delay line.

The delay modulation device is not limited in pulse power and energy.

The delay modulation device is independent of the type of non-linear conversion by N-wave mixing made in the non-linear optical medium. Finally, the delay modulation device is independent of the wavelength of the generated pulses.

The time delay modulation device may be based on different techniques detailed in relation with FIGS. 4 to 6.

FIG. 4 illustrates an exemplary embodiment including a single oscillator 10 as a simpler alternative to two synchronized oscillators 11, 12. The non-linear optical system comprises a source 10, an optical beam splitter 15, a first channel comprising a first pulse selector 41 arranged upstream from a first optical amplifier 81, a second channel comprising a second pulse selector 42 arranged upstream from a second optical amplifier 82. The non-linear optical system further comprises a non-linear optical medium 20 and a filter 30 similar to those of FIG. 3.

In FIG. 4, the optical beam splitter 15 separates the source beam coming from the oscillator 10 so as to form a first and a second source beam. The optical beam splitter 15 may be chosen among an amplitude separator, for example a partially reflective plate, a polarization splitter, or a wavelength splitter. In an exemplary embodiment, a very wide spectrum oscillator 10 and a spectral filter, for example a dichroic mirror, are used to spectrally separate the first end the second source beam.

The first pulse selector (pulse-picker) 41 reduces the Fosc rate of the first source beam to an operating rate Frep1 of the first optical amplifier 81 (Frep1=Fosc/N with N>1). Similarly, the second pulse selector 42 reduces the Fosc rate of the second source beam to an operating rate Frep2 of the second optical amplifier 82 (Frep12=Fosc/N' avec N'>1). The two optical amplifiers 81, 82 do not necessary operate at the same rate. The rate Frep1 of an optical amplifier may be a sub-multiple of the rate Frep2 of the other optical amplifier. In a particular case, the two optical amplifiers operate at the same operating rate Frep.

The non-linear optical medium 20 receives a first source signal at the output of the first optical amplifier 81 and, respectively, a second source signal at the output of the second optical amplifier 82. The non-linear optical medium 20 and the optical filtering device 30 operate similarly to FIG. 3.

When the first and the second pulse selector 41, 42 each select a pulse of the source oscillator 10, so that these two pulses are spatially and temporally superimposed to each other in the non-linear optical medium 20, taking into account the respective wavelengths of the optical paths of the two channels, the non-linear conversion occurs in the non-linear optical medium 20. When the optical paths of the two channels are of same length, it is just necessary to select two pulses coming from a same pulse of the source oscillator 10. On the contrary, when the optical paths of the two channels are of different length, two pulses coming from different source pulses are specially selected to compensate for a delay in one of the two amplification lines and to obtain a spatial and temporal superposition of the pulses in the non-linear optical medium 20.

When it is desired to switch-off a pulse of a non-linearly converted signal 60 at the output of the non-linear optical medium 20, it is just necessary to select a pulse of the first source signal 51 incident on the non-linear optical medium at an instant t by means of the first pulse selector 41 and to configure the second pulse selector 42 so as not to select a pulse of the second source signal 52 incident on the non-linear optical medium at this same instant t, but for example to select a pulse of the second source signal 52 that is incident on the non-linear optical medium at an instant t+1/Fosc. When the pulse of the first source signal 51 and the pulse of the second source signal 52 are temporally separated by 1/Fosc in the non-linear optical medium 20, no non-linear optical conversion occurs in the non-linear optical medium 20.

Advantageously, this delay modulation device generates no power loss at the output of the amplifier 81, 82. The heat charge of the two amplifiers 81, 82 remains identical up to the non-linear optical medium 20.

FIG. 5 shows another embodiment using a single optical delay line 42 controlled on one of the two channels upstream from the non-linear optical medium 20. In this configuration, the pulses coming from an oscillator 10 pass through a rate reducer 44. A optical beam splitter separates, for example in amplitude, in polarization and/or in wavelength, the source signal into a first and, respectively, a second source signal intended to be amplified simultaneously in a first and, respectively, a second optical amplifier 81, 82, arranged in parallel channels. In the second channel, a variable optical delay line 42 is used, which makes it possible to control the optical delay of the second channel with respect to the first channel. The variable optical delay line 42 makes it possible to control the delay value applied to a pulse amplified by the second optical amplifier 81, 82, by switching of this delay between two predetermined values R1, R2.

FIG. 6 shows an example of variable optical delay line, switchable between a first optical delay value and a second optical delay value. An optical modulator 45, of the electro-optic or acousto-optic type, makes it possible to direct a pulse either towards a first optical path 46 or towards a second optical path 47. The first and second optical paths 46, 47 are configured to have different lengths relative to each other. The first and second optical paths 46, 47 are for example based on optical fibres of different lengths. A beam combiner 48, for example a polarizer, is used to recombine the first and second optical paths.

As a function of the modulation voltage applied to the optical modulator 45, a pulse takes either the first optical path 46 or the second optical path 47.

The first optical path 46 is configured to have a first optical delay value, which results in a null time delay between a pulse from the first optical amplifier 81 and a pulse from the second optical amplifier 82, so as to allow the synchronization of these pulses in the non-linear optical medium 20. In this case, the non-linear optical medium 20 produces a non-linearly converted signal when the pulses take the first optical path 46 of the delay line.

On the contrary, the second optical path 47 is configured to have a second optical delay value that results in a non-null time delay between a pulse from the first optical amplifier 81 and a pulse from the second optical amplifier 82, so as to desynchronize, at least partially and preferably completely, these pulses in the non-linear optical medium 20. In the case where the pulses are totally desynchronized from each other, the non-linear optical medium 20 does not produce a non-linearly converted signal when the applied modulation voltage directs the pulses towards the second optical path 47 of the delay line. In the case where the pulses are partially desynchronized, the non-linear optical medium 20 produces a non-linearly converted signal, whose amplitude is limited as a function of the value of the delay induced by the second optical path 47.

A variable optical delay line is hence made in a very compact manner and with a low cost.

In FIG. 7 is shown a non-linear optical four-wave mixing system, comprising a first laser source 11, a second laser source 12, a third laser source 13, a non-linear optical medium 20 and an optical filter 30.

The first laser source 11 emits a first source pulse signal 51, the second laser source 12 emits a second source pulse signal 52, and the third laser source 13 emits a third source pulse signal 53. The third laser source 13 is synchronised with the first laser source 11.

By way of example, it is considered that the three source pulse signals 51, 52, 53 are emitted at the same repetition frequency and at the same wavelength.

A time delay control and command device 40 is combined to the second laser source 12. The time delay control and command device 40 makes it possible to control the time delay of a pulse of the second signal 52 with respect to a pulse of the first signal 51 and of the third signal 53. Similarly to the device described in connection with FIG. 3, the time delay control and command device 40 makes it possible to apply either a first time delay value, denoted R1, or a second time delay value, denoted R2.

When the time delay is equal to the first value, R1, a pulse of the first source signal 51, a pulse of the second source signal 52 and a pulse of the third source signal 53 are temporally and spatially superimposed to each other in the non-linear optical medium 20, so as to generate a pulse 60 by four-wave mixing. The pulse 60 may hence for example be tripled in frequency, i.e. to a wavelength equal to the third of the wavelength of the source pulses 51, 52, 53.

On the contrary, when the time delay is equal to the second value, R2, a pulse 522 of the second source signal is delayed with respect to a pulse of the first source signal 51 and of the third source signal 53, these three pulses do not temporally overlap each other in the non-linear optical medium 20, such that the four-wave mixing cannot occur. In this case, at the output of the non-linear optical medium 20, we find the pulses of the first signal S1, of the third signal S3 and, respectively, of the delayed second signal 522.

At the output of the non-linear optical medium 20, the filter 30 separates, for example in polarization and/or spectrally, to a first channel 31, the pulses 60 obtained by four-wave mixing, and to a second channel 32, the residual pulses of the incident signals 51, 53, 522.

The invention applies to the N-wave mixing of pulses of any duration from the millisecond to the femtosecond.

The one skilled in the art will be able to advantageously implement the invention in other N-wave mixing applications, without departing from the framework of the present invention.

The invention claimed is:

1. A non-linear optical system for generating or amplifying light pulses by N-wave mixing, including at least one source and a non-linear optical medium, said at least one source being adapted to generate at least one first light pulse and one second light pulse having respective durations of the same order of magnitude, said non-linear optical medium being adapted to receive said at least one first light pulse and one second light pulse, wherein the non-linear optical system for generating or amplifying light pulses includes:

a modulation device adapted to receive the first light pulse and the second light pulse, synchronized with each other, and to modulate a time delay between the second light pulse and the first light pulse in the non-linear optical medium, the time delay modulation device being arranged upstream from the non-linear optical medium, and the modulation device being adapted to fast switch the time delay between a first null delay value (R1) and, respectively, a second delay value (R2) higher, in absolute value, than the durations (D) of the light pulses and lower than a pulse repetition period (T) reduced by the duration (D) of a light pulse, so as to trigger on demand and, respectively, instantaneously stop, the generation or the amplification of a light pulse by N-wave mixing of said at least one first light pulse and one second light pulse in the non-linear optical medium.

2. The non-linear optical system for generating or amplifying light pulses by N-wave mixing according to claim 1, wherein the time delay modulation device is switchable between the first delay value (R1) and the second delay value (R2), the first delay value (R1) being configured so that said at least one first light pulse and one second light pulse are spatially and temporally superimposed to each other in the non-linear optical medium, and the non-linear optical medium being configured to generate or amplify a light pulse by N-wave mixing of said at least one first light pulse and one second light pulse, where N is an integer higher than or equal to three, and the second delay value (R2) being configured so that said second light pulse has a time delay with respect to said at least one first light pulse in the non-linear optical medium, the second delay value (R2) being adapted to limit the generation or the amplification of the light pulse by N-wave mixing of said at least one first light pulse and one second light pulse in the non-linear optical medium.

3. The system according to claim 2, further comprising an optical filtering device arranged at the output of the non-linear optical medium, the optical filtering device being configured to spatially separate, to one output, the light pulse generated or amplified by N-wave mixing and, to another output, the first light pulse and/or the second light pulse.

4. The system according to claim 2, comprising a first optical amplifier arranged to receive a first source signal and form the first light pulse and a second optical amplifier arranged to receive a second source signal and form the second light pulse.

5. The system according to claim 1, further comprising an optical filtering device arranged at the output of the non-linear optical medium, the optical filtering device being configured to spatially separate, to one output, the light pulse generated or amplified by N-wave mixing and, to another output, the first light pulse and/or the second light pulse.

6. The system according to claim 5, wherein the non-linear optical medium is configured to generate a light pulse by sum frequency, the optical frequency of the light pulse generated by sum frequency being equal to the sum of the optical frequencies of said at least one first light pulse and one second light pulse, and wherein the optical filtering device includes a spectral filter adapted to separate the sum optical frequency from the respective optical frequencies of said at least one first light pulse and one second light pulse.

7. The system according to claim 6, comprising a first optical amplifier arranged to receive a first source signal and form the first light pulse and a second optical amplifier arranged to receive a second source signal and form the second light pulse.

8. The system according to claim 5, comprising a first optical amplifier arranged to receive a first source signal and form the first light pulse and a second optical amplifier arranged to receive a second source signal and form the second light pulse.

9. The system according to claim 1, comprising a first optical amplifier arranged to receive a first source signal and form the first light pulse and a second optical amplifier arranged to receive a second source signal and form the second light pulse.

10. The system according to claim 9, including a first source adapted to generate the first source signal and a second source adapted to generate the second source signal, and a device for synchronizing the first source signal with respect to the second source signal.

11. The system according to claim 10, wherein the modulation device is integrated to the second source.

12. The system according to claim 9, including a source adapted to generate a source pulse light signal and a beam splitter configured to separate the source pulse light signal and form the first source signal and the second source signal.

13. The system according to claim 9, wherein the time delay modulation device includes a first pulse selector arranged in an optical path of the first source signal and a second pulse selector arranged in another optical path of the second source signal.

14. The system according to claim 9, wherein the time delay modulation device includes a variable optical delay line arranged in the optical path of the second source signal.

15. The system according to claim 14, wherein the variable optical delay line comprises an acousto-optic or electro-optic modulator configured to switch the second source signal either towards a first optical path, having a first optical delay value associated with the first time delay value, or towards a second optical path, having a second optical delay value associated with the second time delay value.

16. The system according to claim 9, wherein,
the non-linear optical system comprises a single oscillator that is a source adapted to generate a source pulse light signal and a beam splitter configured to separate the source pulse light signal and form the first source signal and the second source signal,
the time delay modulation device includes a variable optical delay line arranged in the optical path of the second source signal, and
the variable optical delay line comprises an acousto-optic or electro-optic modulator configured to switch the second source signal either towards a first optical path, having a first optical delay value associated with the first time delay value, or towards a second optical path, having a second optical delay value associated with the second time delay value.

17. A non-linear optical system for generating or amplifying light pulses by N-wave mixing, including a non-linear optical medium adapted to receive at least one first light pulse and one second light pulse having respective durations of the same order of magnitude,
wherein the non-linear optical system for generating or amplifying light pulses includes:
a modulation device adapted to receive the first light pulse and the second light pulse, synchronized with each other, and to modulate a time delay between the second light pulse and the first light pulse in the non-linear optical medium, the time delay modulation device being arranged upstream from the non-linear optical medium, and the modulation device being adapted to switch the time delay between at least one first delay value (R1) and, respectively, a second delay value (R2), so as to modulate the generation or the amplification of a light pulse by N-wave mixing of said at least one first light pulse and one second light pulse in the non-linear optical medium,
wherein the time delay modulation device is switchable between the first delay value (R1) and the second delay value (R2),
the first delay value (R1) being configured so that said at least one first light pulse and one second light pulse are spatially and temporally superimposed to each other in the non-linear optical medium, and the non-linear optical medium being configured to generate or amplify a light pulse by N-wave mixing of said at least one first light pulse and one second light pulse, where N is an integer higher than or equal to three, and
the second delay value (R2) being configured so that said second light pulse has a time delay with respect to said at least one first light pulse in the non-linear optical medium, the second delay value (R2) being adapted to limit the generation or the amplification of the light pulse by N-wave mixing of said at least one first light pulse and one second light pulse in the non-linear optical medium.

18. The system according to claim 17, further comprising an optical filtering device arranged at the output of the non-linear optical medium, the optical filtering device being configured to spatially separate, to one output, the light pulse generated or amplified by N-wave mixing and, to another output, the first light pulse and/or the second light pulse.

19. The system according to claim 17, further comprising a first optical amplifier arranged to receive a first source signal and form the first light pulse and a second optical amplifier arranged to receive a second source signal and form the second light pulse.

20. A non-linear optical system for generating or amplifying light pulses by N-wave mixing, including a non-linear optical medium adapted to receive at least one first light pulse and one second light pulse having respective durations of the same order of magnitude, wherein the non-linear optical system for generating or amplifying light pulses includes:

a modulation device adapted to receive the first light pulse and the second light pulse, synchronized with each other, and to modulate a time delay between the second light pulse and the first light pulse in the non-linear optical medium, the time delay modulation device being arranged upstream from the non-linear optical medium, and the modulation device being adapted to switch the time delay between at least one first delay value (R1) and, respectively, a second delay value (R2), so as to modulate the generation or the amplification of a light pulse by N-wave mixing of said at least one first light pulse and one second light pulse in the non-linear optical medium, and a first optical amplifier arranged to receive a first source signal and form the first light pulse and a second optical amplifier arranged to receive a second source signal and form the second light pulse, wherein the time delay modulation device includes a first pulse selector arranged in an optical path of the first source signal and a second pulse selector arranged in another optical path of the second source signal.

* * * * *